United States Patent Office 3,469,937
Patented Sept. 30, 1969

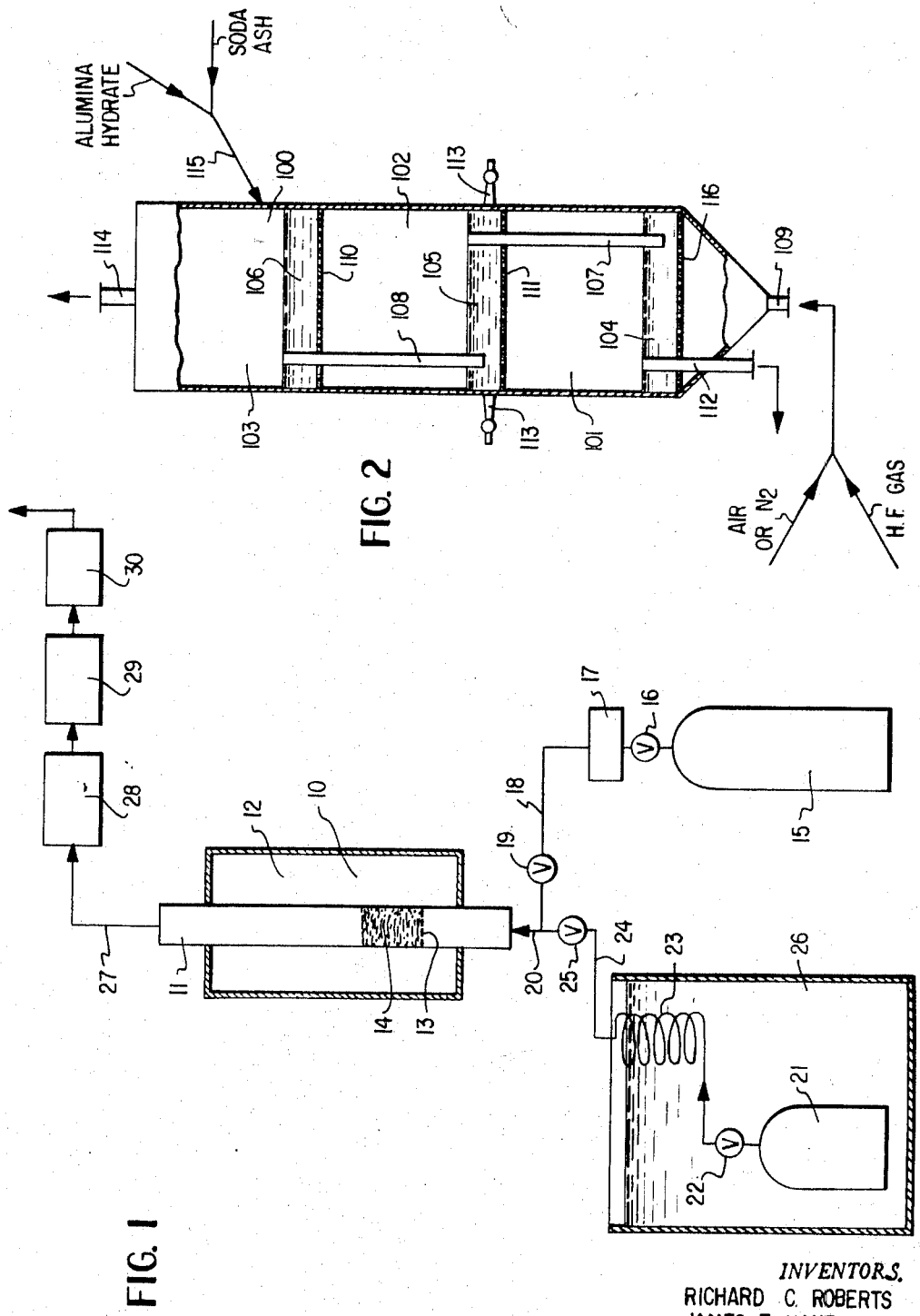

3,469,937
PRODUCTION OF SYNTHETIC CRYOLITE BY
FLUIDIZED DRY PROCESS
Richard C. Roberts, Henrico County, Va., and James F.
Kane, Benton, Ark., assignors to Reynolds Metals Company, Richmond, Va., a corporation of Delaware
Filed Apr. 19, 1966, Ser. No. 543,738
Int. Cl. C01f 7/54; C01b 31/20
U.S. Cl. 23—88
10 Claims

ABSTRACT OF THE DISCLOSURE

Sodium aluminum fluorides, such as cryolite, are manufactured by introducing a finely divided mixture of soda ash and alumina hydrate into a reaction zone, passing inert gas through the mixture at a velocity sufficient to form a fluidized bed while raising the bed temperature to at least 250° C., introducing hydrogen fluoride into the heated fluidized mixture when the bed temperature is in the range 250°–350° C. and completing the formation of sodium aluminum fluoride by simultaneously reacting said soda ash, hydrogen fluoride, and aluminum hydrate at a bed temperature which will minimize product fusion.

---

Figure 3:
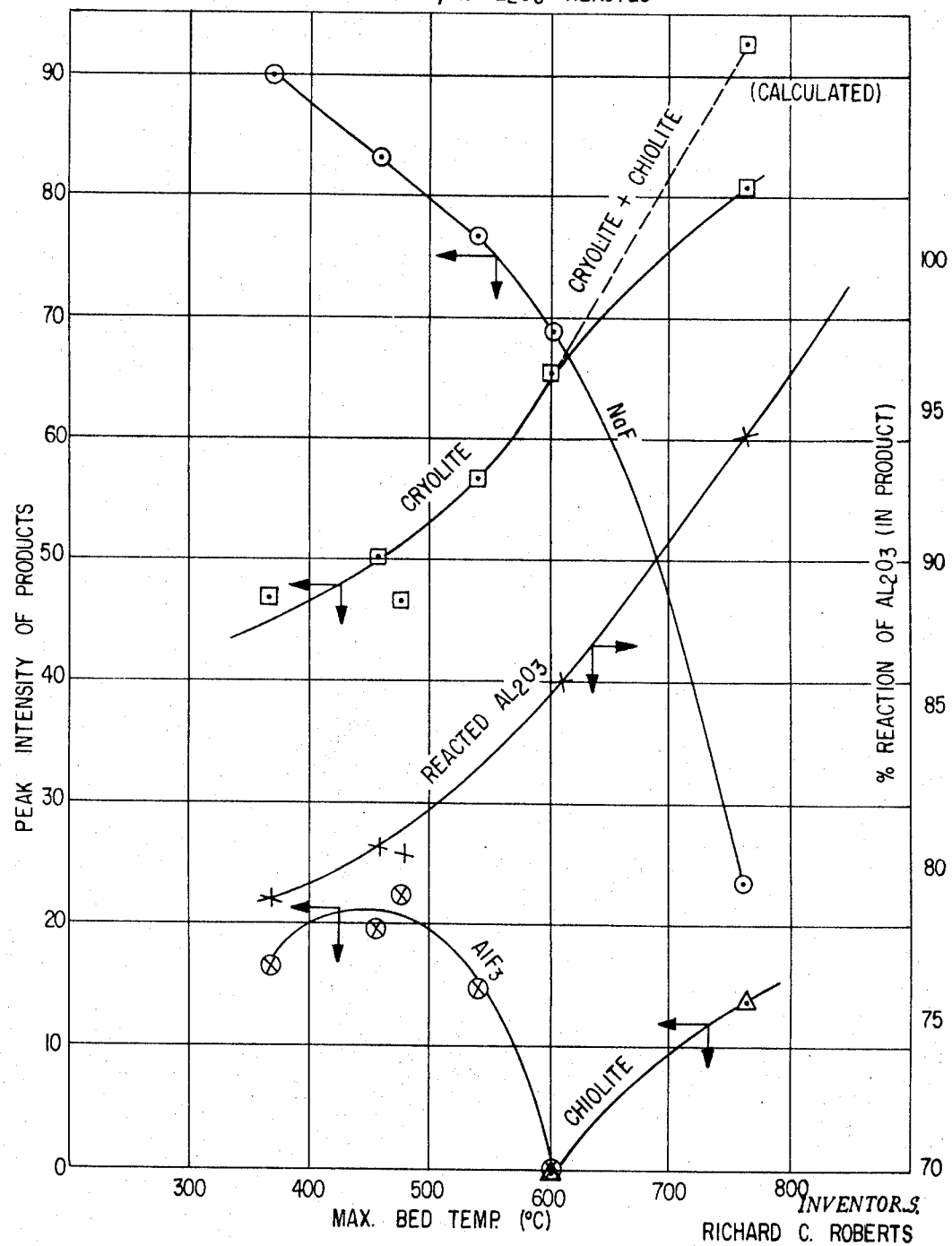

This invention relates to a novel method for the manufacture of sodium aluminum fluorides such as, for example, cryolite, in a fluidized bed reaction. More particularly, the invention concerns the preparation of synthetic cryolite by the reaction of a dry mixture of soda ash and alumina hydrate and hydrogen fluoride aided by prefluidizing the solid reactants with an inert gas.

It is known to prepare synthetic cryolite by the treatment of a mixture of aluminum oxide or aluminum hydrate and sodium carbonate (soda ash) with hydrofluoric acid gas in a tumbling barrel type of apparatus at a temperature between about 400° C. and 500° C., and such a process is disclosed in U.S. Patent 1,937,885. In processes of this kind, the gas and solid reactants pass countercurrent to each other, but it has proved difficult to obtain adequate contact of the reactants and control of reaction temperature. Accordingly, it has been proposed in the prior art to conduct a similar reaction, e.g. reacting finely divided alumina with hydrogen fluorine gas to form aluminum fluoride, by fluidizing a bed of alumina with a stream of hydrogen fluoride gas. Here also, difficulties have developed in that, owing to overheating of the walls of the reactor, and the metal solids bed support, fusion of the aluminum fluoride product takes place, with resultant clogging of the reactor and lowering of the product yield.

It has also been proposed in the prior art to prepare cryolite by contacting gaseous hydrogen fluoride with a solid mixture of alumina hydrate and soda ash is pelletized form at 400° C. to 580° C. However, as set forth in U.S. Patent 3,104,156, the product is found to be a mechanical mixture of sodium fluoride and aluminum fluoride, with only a negligible amount of cryolite actually formed. Where the temperature is maintained at 560°–580° C. the solid material agglomerates into hard compact lumps which are inadequately contacted by the HF gas.

A similar phenomenon of fusion of the aluminum fluoride with clogging of the reactor takes place when alumina hydrate and soda ash are reacted in a fluidized bed with hydrogen fluoride gas to form sodium aluminum fluorides, the degree of product fusion amounting to as much as 82%. Thus, the use of fluidizing does not of itself solve the problem either of avoiding fusion, or of getting the reactants to form sodium aluminum fluorides, such as cryolite, with a satisfactory degree of conversion.

In accordance with the present invention, it has been found that by careful selection of critical temperature limits, and by prefluidizing the solid reactants by means of an inert gas prior to the introduction of the hydrogen fluoride gas into the reaction system, the difficulties arising from overheating and resultant product fusion are avoided.

The reaction of soda ash, alumina hydrate, and hydrogen fluoride to form sodium aluminum fluorides, such as cryolite takes place in the dry state in accordance with the equation:

$$3Na_2CO_3 + Al_2O_3 \cdot 3H_2O + 12HF \rightarrow 2Na_3AlF_6 + 9H_2O + 3CO_2$$

The reactants are employed in approximately stoichiometric ratio, but the ratios of the reactants can be adjusted to produce various molecular combinations of NaF and AlF$_3$, as desired.

In preparing the solid charge, stoichiometric or other suitable quantities of anhydrous soda ash and ground alumina hydrate are advantageously ground together in a suitable comminuting apparatus such as a ball mill and then granulated by tumbling in a cylinder with addition of a small amount of water in the form of a spray. The resulting granules are screened to a 8-mesh size and dried at about 110° C. The dried granules are then crushed to a particle size passing a 45-mesh screen, for example, by ball milling. For fluidization, favorable characteristics are found in the particle size range —45 to +100 mesh. The finely divided soda ash-alumina hydrate mixture serves as the fluidized bed.

In accordance with the invention, a bed of finely divided mixed soda ash and alumina hydrate is placed in a suitable reactor which is brought up to the desired temperature to initiate the reaction while at the same time a stream of an inert gas, such as, for example, nitrogen, is employed to fluidize the solids bed and to prevent hot spots from forming. The reaction may be carried out batchwise, or continuously. The reactor may be any suitable type of commercial apparatus employed for either batch or continuous fluidized bed reactions.

The reaction of the above equation is favored by a negative free energy and produces a large temperature rise in the product owing to the strong exothermic effect. In order to avoid substantial fusion of the product from the large temperature increase, the temperature at which the feed of hydrogen fluoride gas is commenced, after prefluidizing with the inert gas, should not exceed about 350° C. although the reaction may proceed at about 250° C. When this temperature is reached, the flow of inert gas may be discontinued, and the flow of hydrogen fluoride gas at a velocity sufficient to maintain fluidization of the bed is begun. The hydrogen fluoride gas flow is continued for a time sufficient to produce maximum conversion, the period of contact ranging from about 15 to 45 minutes. During this time the temperature in the reactor is kept below about 650° C. in order to minimize product fusion. If desired, the hydrogen fluoride may be supplied to the reactor in admixture with an inert gas, such as nitrogen.

The practice of the invention will be better understood by reference to the accompanying drawings in which FIG. 1 illustrates a form of the apparatus suitable for batch operation, in schematic manner.

In the drawing, fluidizing reactor 10 comprises a reactor tube 11 and a heating furnace jacket 12, which may be an electric heater equipped with suitable controls. The reactor tube 11 is made of a corrosion resistant metal, such as, for example Inconel, an alloy of nickel, chromium, and iron (International Nickel Co., New York). Positioned in the interior of reactor tube 11 is a screen bed support 13, which may be made of 200 mesh Monel metal. The bed support 13 serves to support the solid finely divided mixture of soda ash and alumina hydrate 14. A source of inert gas (nitrogen) 15 is connected to the reactor tube 11 via metering valve 16 and flow meter 17, conduit 18 and valve 19, leading to feed line 20.

A source of hydrogen fluoride gas 21, controlled by metering valve 22, leads to the reactor tube 11 via indirect heat exchange coil 23, conduit 24 and valve 25, connecting with feed line 20. The hydrogen fluoride gas and heat exchanger assembly is immersed in a water bath 26 maintained at any desired temperature.

The reactor tube 11 is equipped at its upper end with discharge line 27 leading to trap 28, thence to a first scrubber 29 and a final scrubber 30, which vents to the stack.

In batch operation, the bed temperature should not exceed 350° C. at the time of introduction of hydrogen fluoride gas. However, this temperature limitation may be raised if a diluted HF gas is employed in order to remove heat. The reaction temperature is, however, kept below about 650° C. to minimize product fusion.

For continuous operation, the reactor 10 may be replaced by any suitable continuous fluidized bed reactor, such as that shown in FIG. 2 of the accompanying drawings, or such as that disclosed, for example, in U.S. Patent 2,715,548. Such a continuous reactor 100 comprises a set of superimposed chambers 101, 102 and 103 each containing a fluidized bed 104, 105 and 106, the lowermost bed 104 being at the highest temperature. Solid feed is introduced at the top, and hydrogen fluoride gas at the bottom of the reactor. Vertical conduits 107 and 108 extend between the respective chambers, the upper end of the conduit being open and at the level of the surface of the bed in the chamber. The lower end of the conduit is immersed in the bed of the chamber underneath, thus forming a column of fluidized solids in the conduit. The gas introduced at inlet 109 rises through perforated plates 110, 111 and 116 supporting the beds in the successive chambers at sufficient velocity to maintain the beds in fluidized condition and to prevent flow of solids down through the perforations. The movement of solids is downward through the reactor, the alumina hydrate and soda ash entering via conduit 115 and the product leaves through exit conduit 112. The gas supply portions of the apparatus are as shown in FIG. 1. Gas burners 113 are provided to initially raise the temperature of the system to operating levels. Provision is also made for introduction of dilution air or inert gas to remove excess reaction heat or to assist in fluidization, as the situation may require.

In continuous operation, the finely divided mixture of alumina hydrate and soda ash in the first or uppermost stage of the system shown in FIG. 2, after having first been heated and brought into fluidized bed condition in chamber 102, is passed to a first reaction chamber 102 in which the bed temperature is maintained at about 350–450° C. to produce reaction product without fusion, and to allow the solid feed in reaction chamber 102 to scrub HF from the exhaust gases of the lower chamber 101 prior to their leaving via exit 114. The successive reaction stages or zones as shown in chambers 102 and 101 are progressively higher in temperature in order to increase reaction efficiency. The last or lowest stage is advantageously at a temperature between about 600°–715° C., preferably about 700° C. As the fluidized mixture passes through successive reaction zones, it encounters HF gas continuously passed through the reaction zones, countercurrent to the flow of fluidized mixture at a velocity sufficient to maintain the mixture in fluidized condition. In the course of the reaction, gaseous reaction products, such as $CO_2$ and $H_2O$, are evolved, and these, together with the HF gas aid in maintaining fluidized conditions in the system.

The following example serves to illustrate the practice of the invention and the operation of the apparatus, but is not to be regarded as limiting:

Example

A laboratory scale batch reactor as shown in FIG. 1, fitted with 1″ Inconel reactor tube 11, which was provided at its lower end with a 200 mesh Monel metal screen bed support 13, was heated by a tube furnace 12. Nitrogen gas supply was provided by cylinder 15, while a cylinder of hydrogen fluoride gas 21 was kept immersed together with its heat exchange coil 23 in a water bath 26 at a temperature of 85° F. A thermocouple was inserted into the reactor tube and connected to a temperature recorder.

A stoichiometric mixture of alumina hydrate and anhydrous soda ash was prepared by grinding the ingredients in a ball mill, and then granulating the mixture by tumbling in a cylinder while water was added as a spray. The granules were pressed through an 8-mesh screen and dried at 110° C. The dried granules were crushed so that they would pass a 45 mesh screen, and the —45+100 mesh material was separated. 16 grams of this mixture was charged into the reactor tube to provide a 2-inch deep bed. Scrubber liquid for the tray 28 and scrubbers 29 and 30 was a caustic solution containing about 190 g.p.l. free soda (expressed as $Na_2CO_3$). About 300 ml. of this solution was employed in the trap and the first scrubber; about 350 ml. was used in the final scrubber.

The reactor was brought to an initial temperature while maintaining a flow of nitrogen gas at a velocity of 3.0 liters per minute to fluidize the bed and to prevent hot spots from forming. When the bed temperature reached 353° C., the nitrogen flow was cut off and HF gas was introduced into the reactor tube at a velocity of 1.5 liters per minute. The water bath temperature of 85° F. produced an HF system pressure of about 5 psig, sufficient to fluidize the bed. The HF gas flow was maintained for 17 minutes, during which time the bed temperature reached a maximum of 541° C. The flow of HF gas was then discontinued, and nitrogen again passed through the reactor at a velocity of 2.5 liters per minute.

There was only a very slight amount of fusion in the product, which showed, upon analysis, a composition representing an alumina conversion of 84.3%. The product analyzed 79.20% cryolite, 16.59% NaF, and 3.57% free $Al_2O_3$.

For comparison, a run was made in the same apparatus, but omitting the nitrogen gas flow, for the same period of time of 17 minutes. The bed temperature at the time of introducion of HF gas had risen to 700° C. and the maximum bed temperature attained was 761° C. These high temperatures resulted in a product which was 82% fused. The alumina conversion in the fused portion of the product was only 73.1%.

FIG. 3 of the accompanying drawings is a set of curves which relate the phases identifiable by X-ray diffraction data, and the percentage of alumina reacted in the product to the maximum bed temperature attained. It will be seen from FIG. 3 that the relationship between peak intensity and percentage by weight is different for each compound designated. Thus, for example, NaF with a peak intensity of 100 may represent 20% NaF, while a peak intensity of 50 for cryolite may indicate 60%.

It will be seen from FIG. 3 that in accordance with the method of the invention, about 50% cryolite is formed in the range 400°–500° C. bed temperature. The percentage of cryolite rises to about 65% as the temperature rises to 580° C., the remaining fluoride materials present being sodium fluoride and aluminum fluoride. Some fusion may occur at temperatures above about 650° C., but this is off-set by higher reaction efficiency and a more satisfactory product.

Thus, FIG. 3 indicates that the general efficiency of the reaction increases with increasing maximum bed temperature, over the range 367°–761° C., as shown by the cryolite and reacted alumina curves. FIG. 3 further discloses that NaF and $AlF_3$ do not co-exist from about 600°

C. upward. The predominant phase present over the range 367°–761° C. is cryolite and not a mechanical mixture of NaF and AlF$_3$.

It is sometimes desirable to produce so-called non-stoichiometric cryolite, containing an excess of ether NaF or AlF$_3$. The fluid bed method of the present invention readily permits this to be done by a variation in the ratio of soda ash and alumina in the feed material.

While present preferred embodiments of the invention have been illustrated and described, it will be apparent that the invention may be otherwise variously embodied and practiced within the scope of the following claims.

What is claimed is:

1. Method for the manufacture of sodium aluminum fluorides which comprises the steps of:
   (a) introducing a finely divided mixture of soda ash and alumina hydrate into a reaction zone;
   (b) passing inert gas through the mixture in said reaction zone at a velocity sufficient to transform said mixture into a fluidized bed and raising the temperature of the bed to the range of about 250° C. to 350° C.
   (c) introducing hydrogen fluoride gas into the heated fluidized mixture in said reaction zone when the bed temperature is in the range of about 250° C. to 350° C., said gas being introduced at a velocity sufficient to maintain said mixture in fluidized bed condition, completing the formation of sodium aluminum fluoride at a bed temperature not exceeding about 650° C. to minimize product fusion; and
   (d) recovering the sodium aluminum fluoride.

2. The method of claim 1 in which the inert gas is nitrogen.

3. The method of claim 1 in which the mixture of soda ash and alumina hydrate has a particle size between about −45 and +100 mesh.

4. The method of claim 1 in which the soda ash and alumina hydrate are present in approximately stoichiometric proportions to form cryolite.

5. The method of claim 1 in which the hydrogen fluoride gas is supplied in admixture with inert gas.

6. The method of claim 1 which includes the steps of stopping the flow of hydrogen fluoride gas to the reaction zone and then passing inert gas through the reaction zone to cool the sodium aluminum fluoride formed, followed by recovery of the sodium aluminum fluoride.

7. Method for the manufacture of synthetic cryolite which comprises the steps of:
   (a) introducing a finely divided mixture of soda ash and alumina hydrate in approximately stoichiometric proportions into a heated reaction zone;
   (b) passing inert gas through the heated mixture in said reaction zone at a velocity sufficient to transform said mixture into a fluidized bed until the temperature of the bed reaches about 350° C.;
   (c) introducing hydrogen fluoride gas into the heated fluidized mixture in said reaction zone at a velocity sufficient to maintain said mixture in fluidized bed condition and to form cryolite while keeping the bed temperature below about 650° C. to minimize product fusion; and
   (d) stopping the flow of hydrogen fluoride gas, passing nitrogen through the reaction zone to cool the cryolite formed, and then recovering the cryolite.

8. Method for the continuous production of sodium aluminum fluorides which comprises the steps of:
   (a) introducing an inert gas into a finely divided mixture of soda ash and alumina hydrate to maintain a fluidized bed in a heating zone and raising the temperature of the bed to the range of about 250° C. to 350° C.;
   (b) continuously discharging said mixture from the fluidized bed of said heating zone to the first of successive reaction zones;
   (c) continuously introducing hydrogen fluoride gas into the heated mixture in the last of said reaction zones and maintaining said mixture therein in fluidized bed condition, while keeping the bed temperature in said last or lowest zone at a level which will result in formation of sodium aluminum fluoride and which will minimize product fusion;
   (d) continuously passing hydrogen fluoride gas and any gaseous reaction products from said last reaction zone into the fluidized mixture in a preceding reaction zone which is at lower temperature than said last reaction zone to minimize product fusion in said preceding reaction zone; and
   (e) continuously recovering sodium aluminum fluoride from the last reaction zone.

9. The method of claim 8 in which the soda ash and the alumina hydrate are present in approximately stoichiometric quantities to produce cryolite.

10. The method of claim 8 in which the hydrogen fluoride is supplied in admixture with an inert gas to control reaction heat.

References Cited

UNITED STATES PATENTS

| | | | |
|---|---|---|---|
| 1,937,885 | 12/1933 | Gitzen et al. | 23—88 |
| 2,996,354 | 8/1961 | La Croix | 23—88 |
| 3,057,680 | 10/1962 | Schytil et al. | 23—88 |
| 3,063,799 | 11/1962 | Hinkle | 23—88 |
| 3,323,861 | 6/1967 | Toyabe et al. | 23—88 |

FOREIGN PATENTS

| | | |
|---|---|---|
| 505,199 | 8/1954 | Canada. |
| 1,309,300 | 10/1962 | France. |

EDWARD STERN, Primary Examiner

U.S. Cl. X.R.

23—150